United States Patent [19]

Okawa

[11] Patent Number: 6,064,537
[45] Date of Patent: May 16, 2000

[54] DISK DRIVE WITH FAULT DETECTOR FOR ERASE HEADS

[75] Inventor: Yoshihisa Okawa, Gunma, Japan

[73] Assignee: NEC Corporation, Japan

[21] Appl. No.: 08/621,808

[22] Filed: Mar. 22, 1996

[30] Foreign Application Priority Data

Mar. 22, 1995 [JP] Japan ................................. 7-062847

[51] Int. Cl.$^7$ ............................ G11B 15/02; G11B 15/04
[52] U.S. Cl. ............................... 360/66; 360/31; 360/118
[58] Field of Search ................................. 360/55, 57, 60, 360/66, 118, 121, 31, 6, 123; 324/210, 211

[56] References Cited

U.S. PATENT DOCUMENTS

| | | | |
|---|---|---|---|
| 4,318,141 | 3/1982 | Haynes ................................. | 360/70 X |
| 4,442,463 | 4/1984 | Krishnamurty et al. .................. | 360/66 |
| 4,542,428 | 9/1985 | Yanagi .................................. | 360/77 X |
| 4,613,920 | 9/1986 | Higuchi et al. ...................... | 360/118 X |
| 4,779,146 | 10/1988 | Chuma et al. ........................ | 360/66 X |
| 4,862,304 | 8/1989 | Yunoki et al. ........................ | 360/66 X |
| 4,901,169 | 2/1990 | Hamaoka et al. ...................... | 360/66 |
| 4,914,532 | 4/1990 | Ohashi et al. ........................ | 360/66 |

*Primary Examiner*—Aristotelis M. Psitos
*Assistant Examiner*—K. Wong
*Attorney, Agent, or Firm*—Ostrolenk, Faber, Gerb & Soffen, LLP

[57] ABSTRACT

A floppy disk drive comprises a read/write head and a pair of erase heads. The read/write head has a gap that extends across and beyond opposite edges of a track, while the gaps of the erase heads are aligned with each other and extend from the opposite edges of the track to create a pair of erased regions on opposite sides of the track. A wire circuit activates the read/write head in response to an output signal from a host system for recording signals along a sector of a track. An erase circuit activates the erase heads in response to the output of the host system for creating the erased regions along a length that corresponds to the sector. A fault detector is provided for detecting a potential developed by the erase heads to allow the write circuit to respond to the output of the host system when the potential is high and prevent the read/write head from responding to the output when the potential is low.

4 Claims, 3 Drawing Sheets

DIRECTION OF DISK ROTATION

DIRECTION OF DISK ROTATION

DIRECTION OF DISK ROTATION

DISK DRIVE WITH FAULT DETECTOR FOR ERASE HEADS

BACKGROUND OF THE INVENTION

1. Field of the Invention

The present invention relates to a disk drive for flexible removable disks such as floppy disks. The present invention is useful for giving an early warning to computer users when the erase heads of a disk drive fail to operate properly.

2. Description of the Related Art

In conventional floppy disk drives, data are recorded on a track using a read/write head by overwriting data which may be previously recorded on the track. Erase heads are provided to create non-recorded regions on the opposite sides of the new track by erasing portions of the previous signals which may remain due to possible off-track tracing of the head assembly. However, if the erase heads should become faulty while the read/write head operates properly, portions of signals on old tracks may be left unerased, and floppy disks containing such flaws may go unnoticed by computer users. If such disks are used on a different disk drive, reading errors are likely to occur due to possible off-track tracing errors.

SUMMARY OF THE INVENTION

It is therefore an object of the present invention to provide a disk drive that disables write operation when side erasing is not working properly.

According to the present invention, there is provided a disk drive for removable disks, the disk drive comprising a head assembly including a read/write head and a pair of erase heads, the read/write head having a gap extending across and beyond opposite edges of a track on a disk, and the erase heads having aligned gaps extending in opposite directions from the edges of the track to create a pair of erased regions on opposite sides of the track. A write circuit activates the read/write head in response to an output signal from a host system for recording signals along a sector of a track. An erase circuit activates the erase heads in response to the output of the host system for creating the erased regions along a length corresponding to the sector. A fault detector is provided for preventing the write circuit from responding to the output of the host system when the erase heads are not working properly.

BRIEF DESCRIPTION OF THE DRAWINGS

The present invention will be described in further detail with reference to the accompanying drawings, in which.

DETAILED DESCRIPTION

Figure 1:
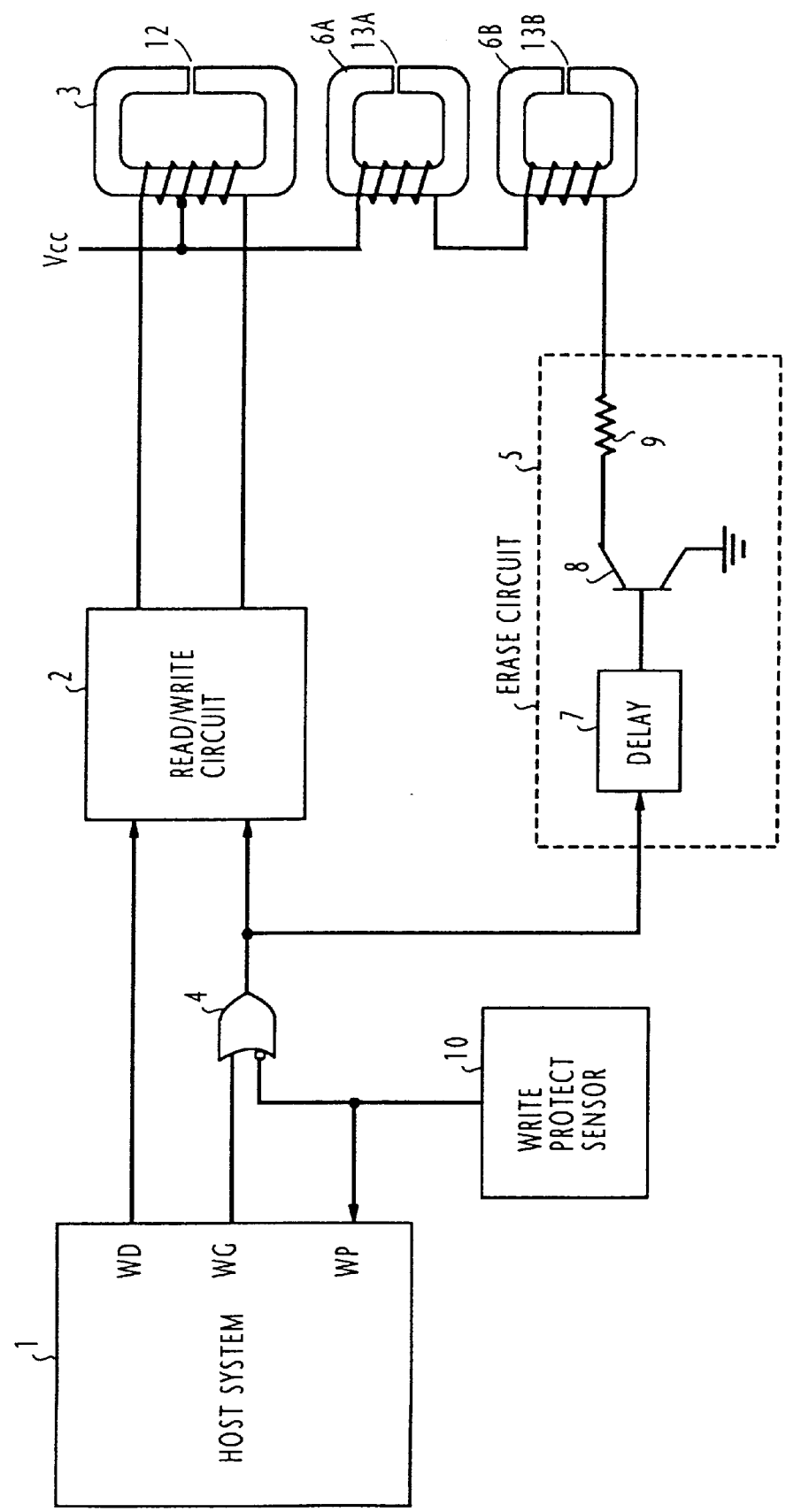
FIG. 1 is a block diagram of a prior art floppy disk drive.

Before proceeding with the detailed description of the present invention, it may be helpful to provide an explanation of the prior art with reference to FIGS. 1 and 2. In FIG. 1, the prior art floppy disk drive has a head assembly comprising a read/write head 3 and a pair of erase heads 6A, 6B which are aligned in the radial direction of disk. A write protect sensor 10 is provided for determining whether the disk is write-protected or not and supplies its output to the write protect terminal (WP) of a host system 1 and a gate circuit 4. A read/write circuit 2 receives a write data signal for a given sector on a selected track from a host system 1. When the write protect sensor 10 determines that the current disk is not write-protected and consequently writable, it supplies a write enable signal to the gate circuit 4 to allow a low-active write gate pulse from the write gate terminal (WG) of the host system 1 to be applied to the read/write circuit 2. This low-active write gate pulse has a duration corresponding to the duration of the sector write data. In response to the write gate pulse, the read/write circuit 2 is enabled to excite the read/write head 3 with signals supplied from the write data terminal (WD) of the host system 1.

During the write operation, the erase heads 6A, 6B are also excited by an erase circuit 5 comprising a delay circuit 7, an emitter-grounded transistor 8 and a current setting resistor 9. When an enable pulse is supplied from the gate circuit 4 to the read/write circuit 2 in response to a write gate pulse from host system 1, this enable pulse is also applied to the delay circuit 7 where it is delayed by an amount corresponding to the spacing between the gap of read/write head 3 and the aligned gaps of erase heads 6A, 6B. Delay circuit 4 reverses the logic level of the delayed pulse and applies its output to the base of the transistor 8, causing it to turn ON to draw a current from the voltage supply Vcc to the windings of the erase heads.

Figure 2A:
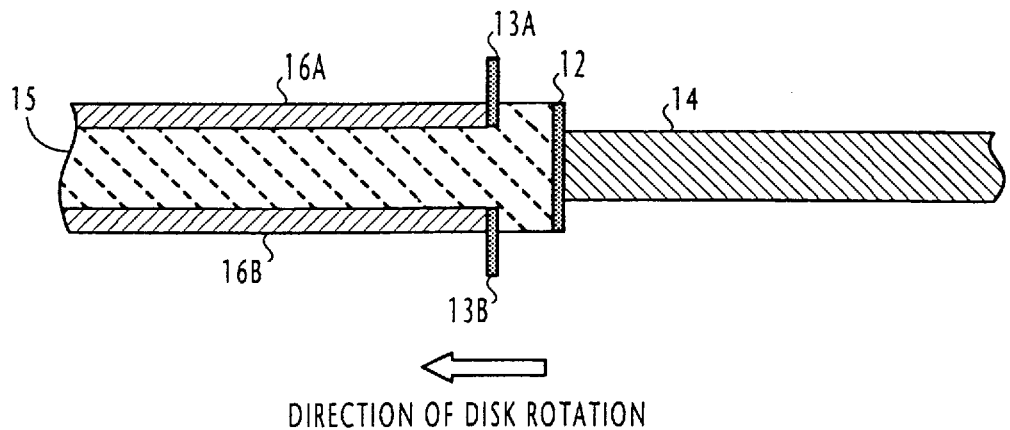
FIGS. 2a, 2b and 2c are illustrations useful for describing the operation of the head assembly of the drive and the problem associated with the erase heads.
Figure 2B:
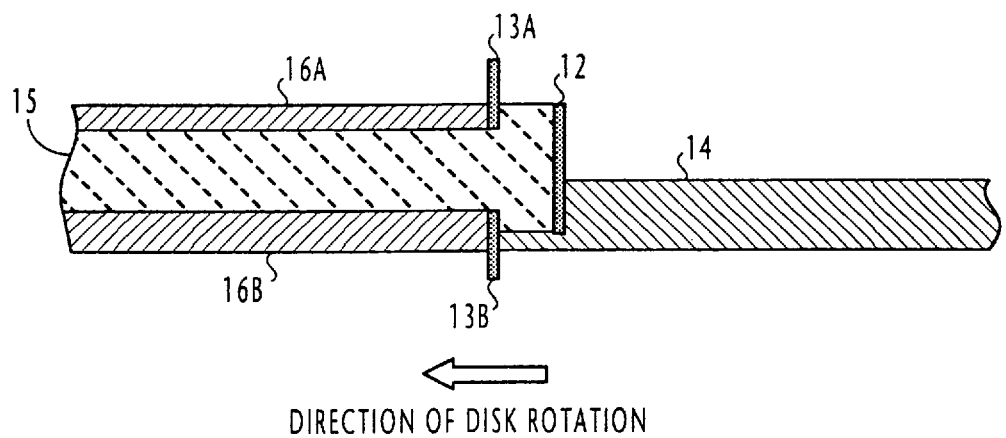

As indicated by numeral 12 in FIG. 2a, the magnetic gap of read/write head 3 extends across and beyond the opposite edges of a track 14 where old data signals may be recorded, so that the old track is completely overwritten with a new track 15 having a greater width than that of the old. The erase heads 6A, 6B are positioned on the opposite sides of the track 14a and their aligned gaps 13a and 13b extend outwards from the respective edges of the track to erase the opposite sides of the new track. This creates erased regions 16A, 16B along the outer sides of the new track in order to suppress noise which might otherwise be generated from such regions even though the new track is somewhat moved sideways as illustrated in FIG. 2b due to off-track tracing error.

As mentioned above, the position of the aligned erase gaps 13A and 13B is physically spaced from the read/write gap 12. The introduction of delay to the erase current by delay circuit 7 is to compensate for the time delay from the instant a signal is recorded by the read/write gap 12 to the instant this recorded signal reaches the position of the aligned erase gaps 13A, 13B. As a result of this delay, the side regions of a new track are completely erased leaving no old track signals on the disk.

Figure 2C:
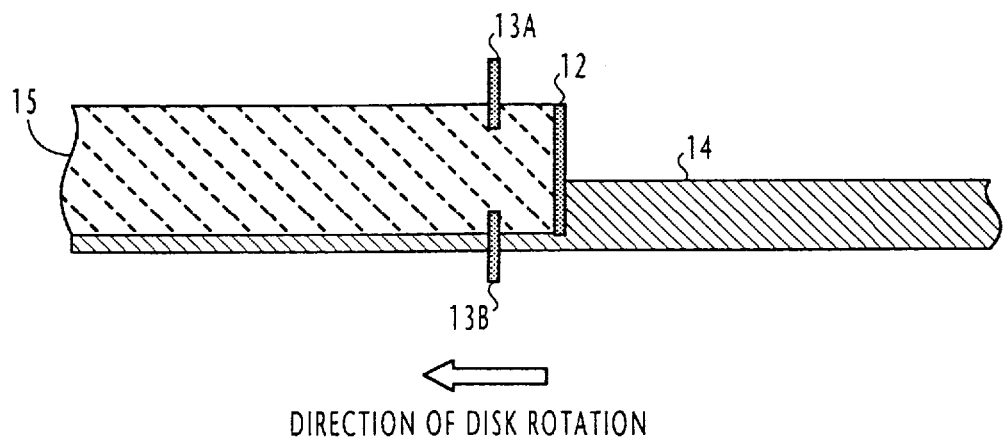

If a failure occurs in the erase heads, a portion of the old track of a disk may be left unerased as shown in FIG. 2c. If such a disk is used in the same disk drive, the read/write head may correctly follow the new track and reads the stored signals with no error. However, if the disk is used on a different disk drive, its read/write head may follow a wrong path due to inherent mechanical tolerances and the unerased portions of the old tracks may be detected as noise. If the noise level is high, the host system may reject the disk as unreadable.

Figure 3:
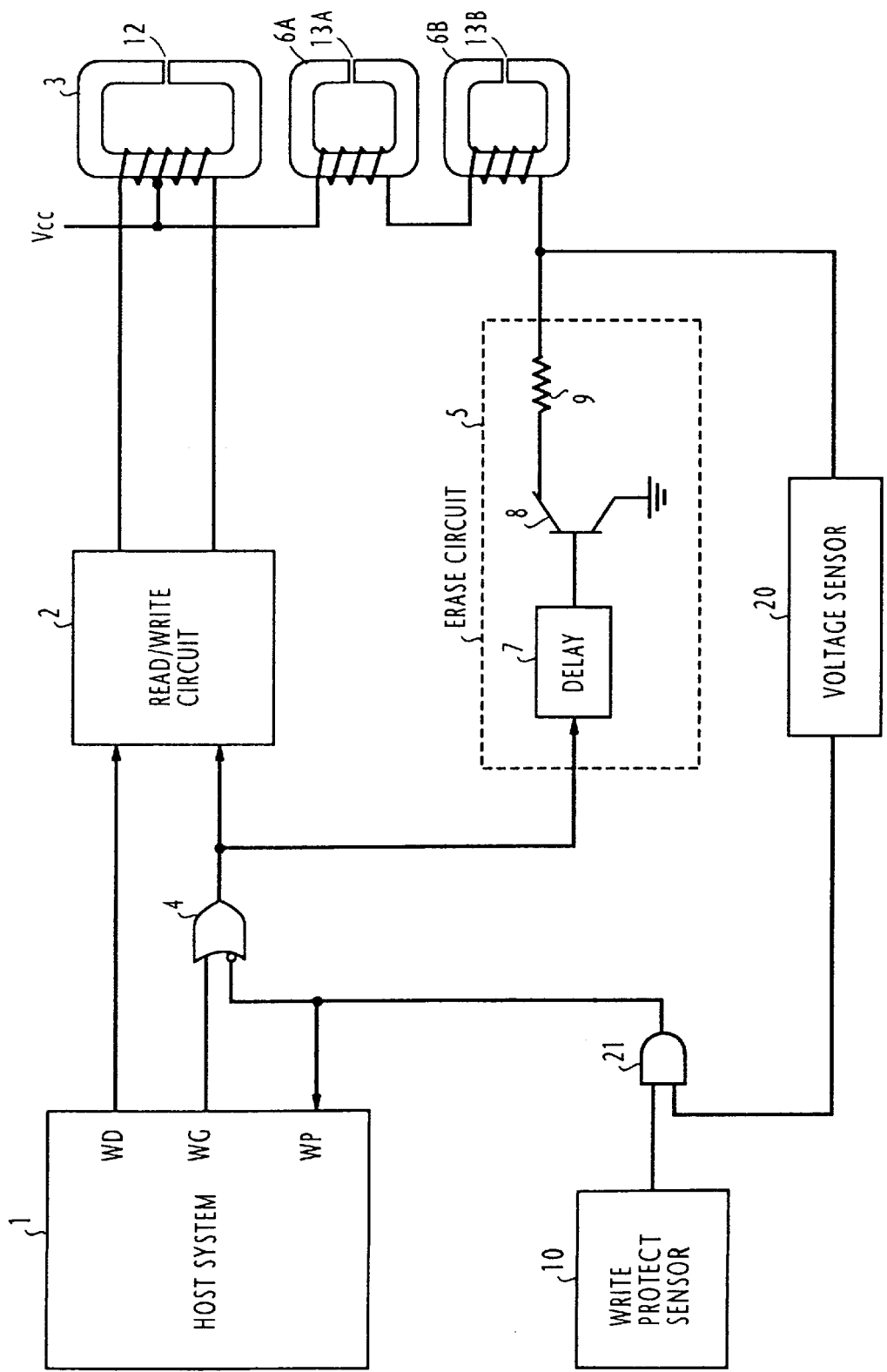
FIG. 3 is a block diagram of a floppy disk drive of the present invention.

As illustrated in FIG. 3, the floppy disk drive of the present invention additionally includes a voltage sensor 20 which is connected to a circuit junction between the windings of the erase heads 6A, 6B and the resistor 9. The voltage 20 translates the input potential to the voltage level of logic circuits and supplies its output to one input of an AND gate 21 to which the output of the write protect sensor 10 is also connected.

When there is no disconnection in the windings of erase heads 6A, 6B, the potential at a junction between the erase windings and the resistor 9 is high. The voltage sensor 20 translates this potential to a corresponding high logic level for enabling the AND gate 21. If a current disk is not a write protect disk, the write protect sensor 10 activates the AND gate 21, enabling the gate circuit 4 to pass a write gate pulse from host system 1 to the read/write circuit 2 and giving an indication to the host system 1 through its write protect terminal that the disk drive is properly working for write operation.

If a disconnection occurs in the windings of the erase heads, the input potential of voltage sensor 20 reduces to ground and the AND gate 21 is supplied with a low logic level from the voltage sensor 20, preventing a write-enable signal from write protect sensor 10 from being supplied to the gate circuit 4 and host system 1. Read/write circuit 2 is thus disabled and the host system 1 knows that the erase heads are faulty and the head assembly needs to be replaced or repaired.

In this way, the disk drive of the present invention provides an early warning to computer users against possible disk recording of unreliable data which would otherwise be left unnoticed with a resultant data error or loss of important data.

What is claimed is:

1. A disk drive for removable disks, comprising:

a read/write circuit responsive to an output signal from a host system and producing a recording current during a read mode;

an erase circuit responsive to said output signal from the host system and producing an erase current;

a head assembly including a read/write head and a pair of erase heads, said read/write head having a magnetic gap the width of which extends in a direction normal to the length of a track of a recording disk and is greater than the width of said track, each of said erase heads having a magnetic gap the width of which extends parallel to the width of the magnetic gap of said read/write head outwardly from a corresponding one of the edges of said track, said read/write head having a winding connected to said read/write circuit to respond to said recording current to record a signal on said track, said erase heads having windings connected in series together to said erase circuit to respond to said erase current for erasing portions of the signal recorded outside said track; and a fault detector connected to the series-connected windings of said erase heads to detect whether a disconnection occurs in said windings and to prevent the read/write circuit from responding to the output signal of the host system when the disconnection occurs.

2. A disk drive as claimed in claim 1, wherein said fault detector comprises means for detecting a potential developed by the windings of said erase heads and means for allowing said write circuit to respond to the output signal of the host system when said potential is high and preventing said read/write circuit from responding to said output signal when said potential is low.

3. A disk drive as claimed in claim 1, wherein said fault detector comprises a voltage sensor connected to said series-connected windings of said erase heads to detect a potential developed by the windings of said erase heads, and a logic circuit connected to the voltage sensor, said logic circuit to allow said write circuit to respond to the output signal of the host system when said potential is high and to prevent said read/write circuit from responding to said output signal when said potential is low.

4. A disk drive as claimed in claim 3, wherein said logic circuit is an AND gate.

* * * * *